(No Model.)

R. P. MARTINEZ.
ELASTIC VEHICLE TIRE.

No. 470,249. Patented Mar. 8, 1892.

WITNESSES:
William Sisson Gillespie
Geo. H. Drew

INVENTOR
Richard Pazos Martinez
BY
Geo Curtis Gillespie ATTORNEY.

UNITED STATES PATENT OFFICE.

RICHARD PAZOS MARTINEZ, OF JERSEY CITY, NEW JERSEY.

ELASTIC VEHICLE-TIRE.

SPECIFICATION forming part of Letters Patent No. 470,249, dated March 8, 1892.

Application filed December 4, 1890. Serial No. 373,620. (No model.)

*To all whom it may concern:*

Be it known that I, RICHARD PAZOS MARTINEZ, a citizen of the United States, and a resident of Jersey City, Hudson county, New Jersey, have invented a new and useful Improvement in Elastic Vehicle-Tires, of which the following is a specification.

The object to be attained in the construction of an elastic vehicle-tire is to provide one which shall be strong, durable, and sufficiently rigid in a wheel acted upon as a driver or otherwise to prevent any loss of power by its operation and at the same time provide ease and comfort for vehicle and rider on a track or rough road. This object I accomplish by securing a series of springs between an inner and outer tire of an ordinarily-constructed wheel, the springs themselves preventing any lateral movement of said outer tire, which shall in itself be of an elastic material protected from wear by a belt or strap of a tough and tenacious substance. The inner tire may be omitted and the springs secured to the spokes, or the spokes themselves may be made to act as springs.

The general construction of my elastic vehicle-tire will be understood by reference to the accompanying drawings, of which—

Figure 2:
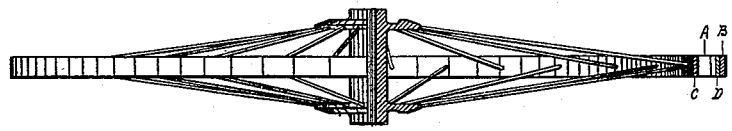
Figure 1:
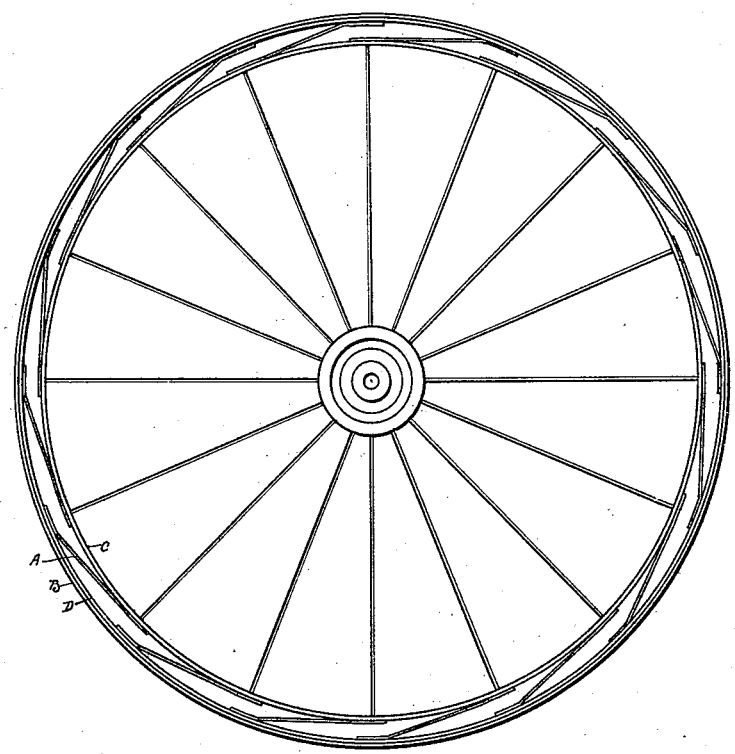

Figure 1 is a side elevation, and Fig. 2 is a plan and sectional view.

Similar letters indicate similar parts in both figures.

A are the springs secured to the inner rigid (or elastic) tire C and the elastic (or rigid) outer tire D, the latter being protected from wear, &c., by the tire B. Said springs may be of other forms than as shown—spiral, circular, rubber, &c.

The whole may be constructed of steel, with a tough-leather strap at B for bicycles, light wagons, &c.

Having now described my said elastic vehicle-tire, what I claim as my invention, and desire to secure by United States Letters Patent, is—

1. In an elastic vehicle-tire, the integral cushion-tire formed by connecting an inner rigid and an outer comparatively rigid tire by multitudinous tangential straight-bar springs, their ends rigidly secured at an acute angle to each tire, substantially as shown and described.

2. In an elastic vehicle-tire, the combination of the multitudinous tangential straight-bar springs, their ends being rigidly secured at an acute angle to the inner tire C and the outer tire D with the tire B, substantially as shown and described.

In testimony that I claim the foregoing as my invention I have signed my name, in presence of witnesses, this 3d day of December, 1890.

RICHARD PAZOS MARTINEZ.

Witnesses:
 G. CURTIS GILLESPIE,
 WM. S. GILLESPIE,
 A. P. MORONEY.